US008866387B2

(12) United States Patent
Futamura et al.

(10) Patent No.: US 8,866,387 B2
(45) Date of Patent: Oct. 21, 2014

(54) VEHICULAR HEADLIGHT APPARATUS

(75) Inventors: Shinichi Futamura, Kuwana (JP); Ryu Mizuno, Kariya (JP)

(73) Assignee: Denso Corporation, Kariya (JP)

( * ) Notice: Subject to any disclaimer, the term of this patent is extended or adjusted under 35 U.S.C. 154(b) by 327 days.

(21) Appl. No.: 13/484,782

(22) Filed: May 31, 2012

(65) Prior Publication Data
US 2012/0313523 A1 Dec. 13, 2012

(30) Foreign Application Priority Data

Jun. 8, 2011 (JP) ................... 2011-127864

(51) Int. Cl.
*B60Q 1/02* (2006.01)
*B60Q 1/14* (2006.01)
(52) U.S. Cl.
CPC .......... *B60Q 1/143* (2013.01); *B60Q 2300/056* (2013.01); *B60Q 2300/45* (2013.01); *B60G 2300/112* (2013.01); *B60Q 2300/334* (2013.01); *B60Q 2300/42* (2013.01)
USPC ................... 315/82; 315/77; 315/80
(58) Field of Classification Search
None
See application file for complete search history.

(56) References Cited

U.S. PATENT DOCUMENTS

| 5,707,129 | A | 1/1998 | Kobayashi |
| 5,877,680 | A | 3/1999 | Okuchi et al. |
| 2008/0106886 | A1 | 5/2008 | Sugimoto et al. |
| 2008/0130302 | A1 | 6/2008 | Watanabe |
| 2008/0298077 | A1 * | 12/2008 | Naganawa et al. ........... 362/466 |
| 2009/0279317 | A1 * | 11/2009 | Tatara ........................... 362/465 |
| 2011/0025209 | A1 | 2/2011 | Nakanishi et al. |

FOREIGN PATENT DOCUMENTS

| EP | 1028025 | 8/2000 |
| JP | 60-064044 | 4/1985 |
| JP | 02-045235 | 2/1990 |
| JP | 06-275104 | 9/1994 |
| JP | 07-108874 | 4/1995 |
| JP | 10-166933 | 6/1998 |
| JP | 2000-229533 | 8/2000 |
| JP | 2003-159986 | 6/2003 |
| JP | 2006-021631 | 1/2006 |
| JP | 2008-110686 | 5/2008 |
| JP | 2008-137516 | 6/2008 |
| JP | 2009-269511 | 11/2009 |
| JP | 2009-269512 | 11/2009 |
| JP | 2010-111341 | 5/2010 |
| JP | 2011-031641 | 2/2011 |

OTHER PUBLICATIONS

Office action dated Apr. 18, 2013 in corresponding Japanese Application No. 2011-127864.

* cited by examiner

*Primary Examiner* — Anh Tran
(74) *Attorney, Agent, or Firm* — Harness, Dickey & Pierce, PLC

(57) ABSTRACT

The vehicular headlight apparatus includes a control means configured to change a light illumination area following a position of a detected target object until a shift angle between a reference direction and a direction to the target object with respect to a headlight is calculated to exceed a maximum limit shift angle, and configured to, when a vehicle speed is detected to exceed a predetermined threshold value, set the maximum limit shift angle to a small deflection angle, and change the present light illumination area to a low-beam light illumination area covered by the headlight in a low-beam state if the shift angle is calculated to exceed the maximum limit shift angle set to the small deflection angle.

4 Claims, 5 Drawing Sheets

VEHICULAR HEADLIGHT APPARATUS

This application claims priority to Japanese Patent Application No. 2011-127864 filed on Jun. 8, 2011, the entire contents of which are hereby incorporated by reference.

BACKGROUND OF THE INVENTION

1. Field of the Invention

The present disclosure relates to a vehicular headlight apparatus.

2. Description of Related Art

There is known a vehicular headlight apparatus configured to control a light distribution pattern of headlights in order that a light illumination area proper for a target object is illuminated by the light emitted from the headlights. For example, refer to Japanese Patent Application Laid-open No. 2006-21631. In such a vehicular headlight apparatus, a light illumination area is determined uniquely by a light distribution pattern. That is, controlling a light distribution pattern means controlling a light illumination area.

When a target object is detected by an object recognition means such as a camera, the above vehicular headlight apparatus changes the present light distribution pattern so that the light emitted from the headlights covers a light illumination area set for the detected target object. For example, when an oncoming vehicle is detected in the high-beam state (the state in which the headlights of the vehicle on which the vehicular headlight apparatus is mounted are in the high-beam state) or the intermediate-beam state (the state in which the headlights are between the high-beam state and the low-beam state), the vehicular headlight apparatus changes the present light distribution pattern so that the present light illumination area excluding an area near the detected vehicle is illuminated. This makes it possible to illuminate to a sufficient distance without dazzling the driver of the oncoming or preceding vehicle.

In the above vehicular headlight apparatus, the light illumination area is changed depending on the position of an oncoming vehicle. That is, the light illumination area is changed so as to follow an oncoming vehicle. Changing of the light illumination area of the headlights is made using swivel motors or the like.

However, the above vehicular headlight apparatus has a problem in that it may occur that the light illumination area cannot be changed quickly enough following change of the position of a target object when the vehicle is running at a high speed on an express way, or when the vehicle is turning sharply. In this case, the light illumination area may deviate from an intended area, causing a problem that the vehicle driver of an oncoming vehicle is dazzled.

SUMMARY

An exemplary embodiment provides a vehicular headlight apparatus including:

a headlight for illuminating ahead of a vehicle;

a changing means for changing a light illumination area of the headlight;

a recognition means for recognizing an object present ahead of the vehicle;

an analyzing means for detecting a target object belonging to one of predetermined categories, and calculating positions of the target object in a vertical direction and in a lateral direction;

a control means for controlling the changing means;

a reference direction determining means for determining a reference direction with respect to a direction of light emission of the headlight when the target object is detected;

a shift angle calculating means for calculating, as a shift angle, an angle between the reference direction and a direction to the target object with respect to the headlight;

a first storage means for storing a maximum deflection angle as a maximum limit shift angle; and the control section being configured to change the light illumination area following a position of the target object until the shift angle exceeds the maximum limit shift angle;

wherein the vehicular headlight apparatus further comprises:

a vehicle speed detecting means for detecting a speed of the vehicle; and a second storage means for storing a small deflection angle smaller than the maximum deflection angle, the control means being configured to, when the vehicle speed is detected to exceed a predetermined threshold value, set the maximum limit shift angle to the small deflection angle, and change the present light illumination area to a low-beam light illumination area covered by the headlight in a low-beam state if the calculated shift angle is calculated to exceed the maximum limit shift angle set to the small deflection angle.

According to the exemplary embodiment, there is provided a vehicular headlight apparatus capable of changing an illumination area of headlights following a detected target object without causing dazzling to a driver of the detected target object due to delay of a following operation of the headlights.

Other advantages and features of the invention will become apparent from the following description including the drawings and claims.

PREFERRED EMBODIMENTS OF THE INVENTION

First Embodiment

Figure 1:
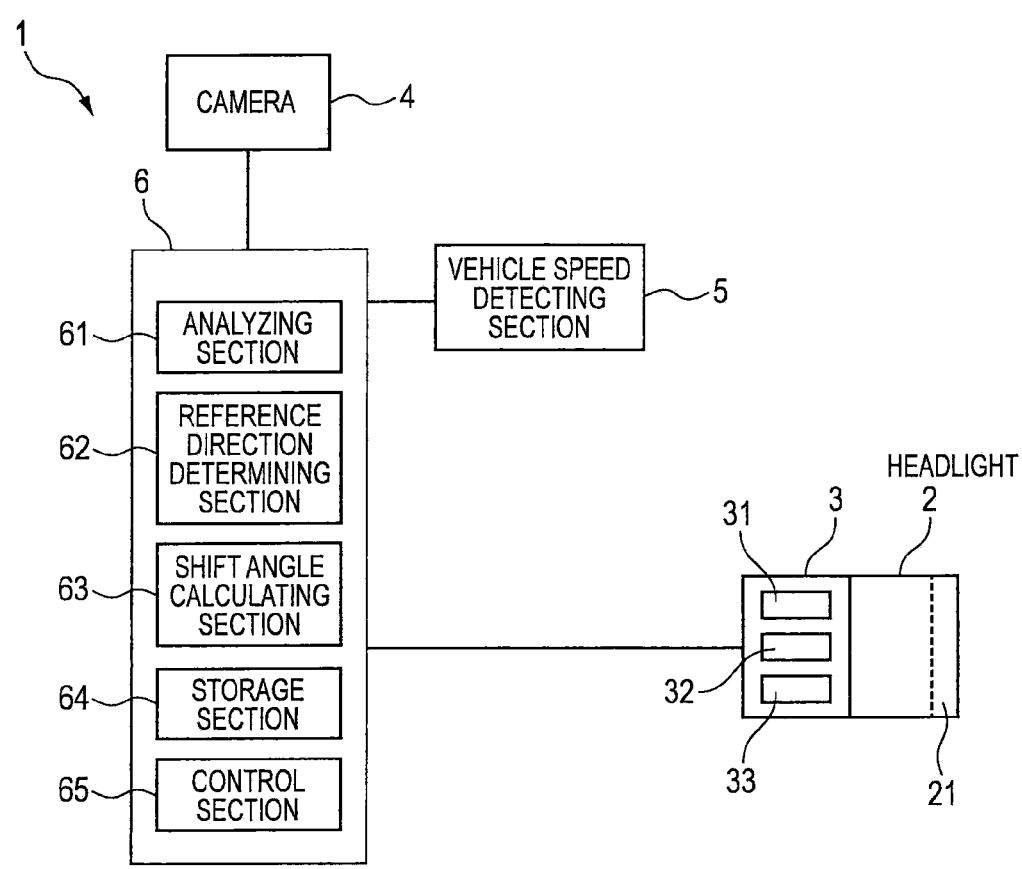
FIG. 1 is a diagram showing the structure of a vehicular headlight apparatus according to a first embodiment of the invention.

As shown in FIG. 1, the vehicular headlight apparatus 1 according to a first embodiment of the invention includes headlights 2, a light distribution changing section 3, a camera 4, a vehicle speed detecting section 5, and an ECU (Electronic Control Unit) 6.

Each headlight 2 includes a light source (not shown), a reflector (not shown) and a slit-plate 21. The headlights 2 are mounted on the front left portion and the front right portion of a vehicle, respectively. The slit-plate 21 is disposed in the front of each headlight 2.

The light distribution changing section 3 provided in each headlight 2 includes a driver motor 31, a leveling motor 32 and a swivel motor 33. The drive motor 31 drives the slit-plate 21 in accordance with a command received from the ECU 6. The leveling motor 32 changes the light axis of the headlight 2 in the up-down direction in accordance with a command received from the ECU 6. The swivel motor 33 changes the optical axis of the headlight 2 in the left-right direction in accordance with a command received from the ECU 6.

A part of the light source of the headlight 2 at which it is covered by the slit-plate 21 is determined depending on the position of the slit-plate 21. By partially covering the light source, it is possible to form a dark part (shadow) in a light illumination area. A light distribution pattern is determined in accordance with the angles of the light axis in the up-down and left-right directions, and the position of the slit-plate 21 of each of the headlights 2. A light illumination area is determined in accordance with a light distribution pattern. In this embodiment, to change the present light illumination area, the light distribution changing section 3 drives the light axis of the light source and the slit-plate 21 for each of the headlights 2 to change the light distribution pattern.

Figure 2:
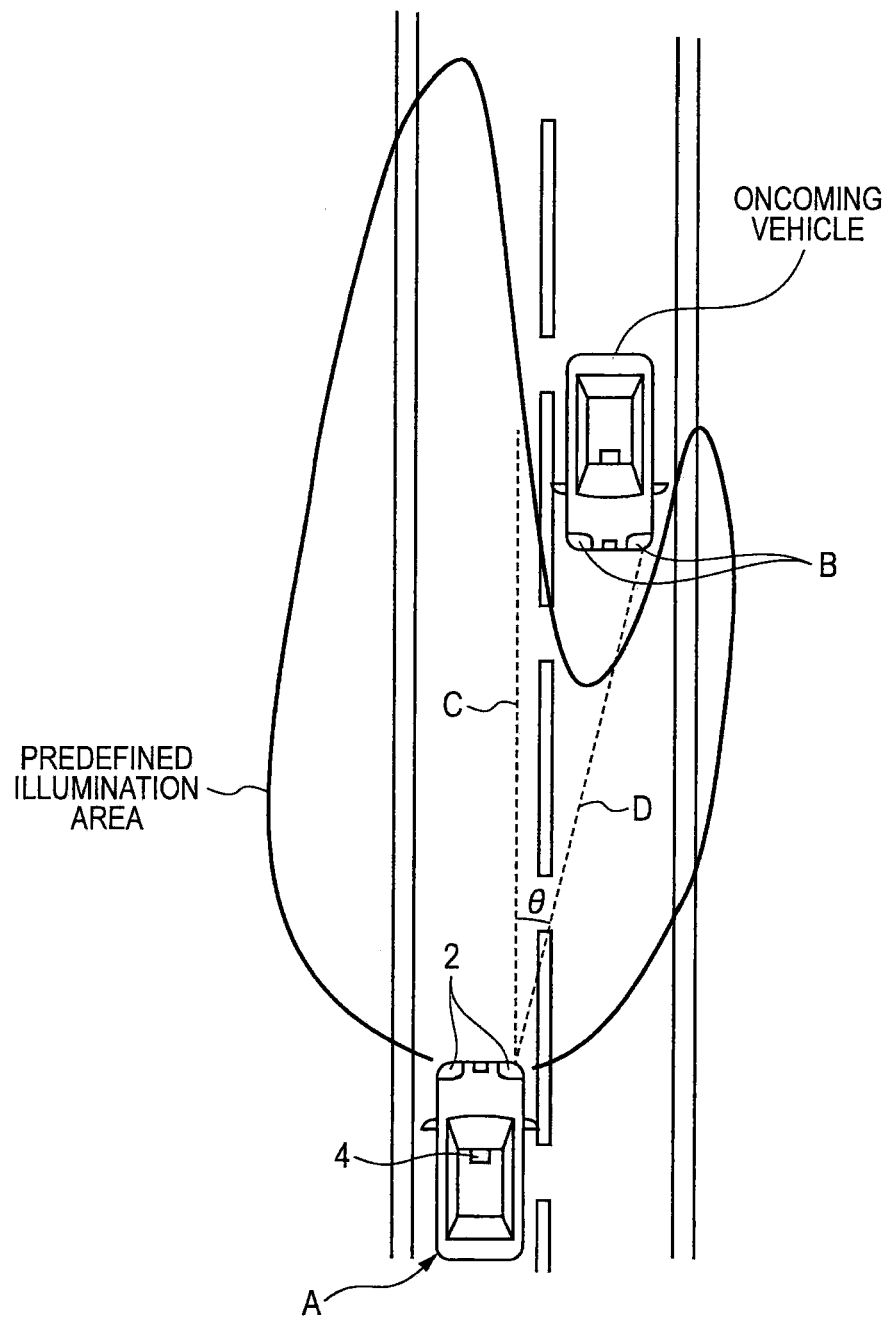
FIG. 2 is a diagram schematically explaining a light illumination area set by the vehicular headlight apparatus according to the first embodiment.

The camera1 4 as an image sensor takes an image ahead of the vehicle. An infrared ray is used for taking an image of a pedestrian or the like. As shown in FIG. 2, the camera 4 is mounted on the vehicle. The camera 4 transmits image data of a taken image to the ECU 6.

The vehicle speed detecting section 5, which is a vehicle wheel speed sensor, detects the vehicle speed. The vehicle speed detecting section 5 transmits data indicative of the detected vehicle speed to the ECU 6.

The ECU 6 is a microcomputer-based electronic control unit for controlling the light distributing changing section 3. Functionally, the ECU 6 includes an analyzing section 61, a reference direction determining section 62, a shift angle calculating section 63, a storage section 64, and a control section 65.

The analyzing section 61 is for analyzing image data transmitted from the camera 4. More specifically, the analyzing section 61 detects a target object B such as a headlight of an oncoming vehicle, and calculates the positions of the target object B in each of the vertical direction (up-down direction) and the lateral direction (left-right direction) based on the image data transmitted from the camera 4. The analyzing section 61 may be incorporated in the camera 4.

The reference direction determining section 62 determines a reference direction based on the direction of illumination of the headlights 2 when the target object B is detected. More specifically, the reference direction determining section 62 determines the reference direction based on the vehicle speed and the steering angle of the vehicle when the target object B is detected. For example, in a case where the target object B is not yet detected, and the vehicle is running straight, since the direction of illumination is approximately perpendicular to the front of the vehicle (more precisely, slightly inwardly), a direction approximately perpendicular to the front of the vehicle is determined as the reference direction (see the broken line C in FIG. 2).

The shift angle calculating section 63 calculates, as a shift angle theta, an angle from the reference direction to the direction to the target object B in the clockwise direction (in the outward direction). More specifically, the shift angle theta is an angle which the broken line C parallel to the reference direction and passing through the headlight 2 (the right side headlight in FIG. 2) makes a broken line D passing through the headlight 2 (the right side headlight in FIG. 2) and the target object B (the left side headlight of an oncoming vehicle). When the target object B is a headlight of an oncoming vehicle, the shift angle theta is calculated with respect to one of the headlights 2 on the side of the oncoming vehicle, that is, the left side headlight 2 in the case of left-hand traffic, and the right side headlight 2 in the case of right-hand traffic. The shift angle theta increases as the target object B approaches the vehicle on which vehicular headlight apparatus 1 is mounted (may be referred to as the vehicle A hereinafter).

The storage section 64, which is constituted of a ROM or the like, stores a maximum deflection angle, a small deflection angle, and a following-operation start range. The maximum deflection angle is an angle value which is set as a later-explained maximum limit shift angle until which the operation to follow the detected target object B is performed. In this embodiment, the maximum deflection angle is set to 5 degrees in the clockwise direction for the right side headlight 2, and to 10 degrees in the counter clockwise direction for the left side headlight 2 (for following a preceding vehicle). The small deflection angle, which is smaller than the maximum deflection angle, is set for at least one of the headlights 2 on the side of the target object B (that is, on the right side headlight 2). In this embodiment, the small deflection angle is set to 2 degrees for the right side headlight 2.

The following-operation start range is such an angle range that if the shift angle theta is within the following operation-start range when the target object B is detected, a following operation (light illumination to a predefined light illumination area) is started. In this embodiment, the maximum value of the following-operation start range is set to the maximum limit shift angle (the maximum deflection angle or the small deflection angle) at the moment when the target object B is detected. In this embodiment, the following-operation start range is an angular range from a predetermined angle slightly smaller than 5 degrees to 5 degrees, or an angular range from a predetermined angle slightly smaller than 2 degrees to 2 degrees.

The control section 65 has a function of controlling the light distribution changing section 3. When the target object B is detected by the analyzing section 61, the control section 65 makes a change from a high-beam illumination area (the illumination area covered by the headlights 2 in the high-beam state) to the predefined light illumination area based on results of the analysis by the analyzing section 61. The predefined light illumination area is a light illumination area (light distribution pattern) set in advance for each of kinds of target objects. Accordingly, the predefined light illumination area is an area to be tracked in accordance with the position of a detected target object.

For example, when the target object B is an headlight of an oncoming vehicle, the predefined light illumination area is the present light illumination area excluding an area near the oncoming vehicle. The position of the area to be excluded changes in accordance with movement of the target object B.

Next, an operation of the ECU 6 is explained with reference to the flowchart of FIG. 3. First, the analyzing section 61 detects a target object B in step S1. Subsequently, the reference direction determining section 62 determines the reference direction, and the shift angle calculating section 63 calculates the shift angle theta in step S2. The control section 65 calculates the predefined light illumination area based on results of analysis by the analyzing section 61.

Subsequently, it is determined whether or not the vehicle speed detected by the vehicle speed detecting section 5 is larger than a predetermined threshold (80 km/h, for example) in step S4. If the determination result in step S4 is affirmative, the operation proceeds to step S5 where the control section 65 sets the maximum limit shift angle to the small deflection angle. If the determination result in step S4 is negative, the operation proceeds to step S6 where the control section 65 sets the maximum limit shift angle to the maximum deflection angle. In this embodiment, since the maximum limit shift angle and the maximum value of the following-operation start range are the same with each other, the maximum value of the following-operation start range is determined at the same time when the maximum limit shift angle is set.

Subsequently, the control section 65 determines whether or not the shift angle theta calculated by the shift angle calculating section 63 is smaller than or equal to the maximum limit shift angle (which is the maximum deflection angle or the small deflection angle) in step S7. If the determination result in step S7 is affirmative, the operation proceeds to step S8 where the predefined light illumination area is set as the present light illumination area. If the determination result in step S7 is negative, the operation proceeds to step S9 where the low-beam light illumination area is set as the present light illumination area. Step S2 may be performed at the time of performing step S7.

According to the first embodiment, the maximum limit shift angle is decreased by being set to the small deflection angle when the target object B is detected while the vehicle A runs at a high speed on an express way. This makes it possible to make a change to the low-beam state before delay occurs in swivel operation of the headlights. For example, if the vehicular headlight apparatus 1 detects an oncoming vehicle when the vehicle A is running in the high-beam state on an express way, the swivel operation is performed in the intermediate-beam state to illuminate the predefined light illumination area until the oncoming vehicle substantially approaches the vehicle A, and a change from the intermediate-beam state to the low-beam state is made earlier than when the vehicle A is running at a low or intermediate speed. Accordingly, according to the first embodiment configured to decrease the maximum limit shift angle when the vehicle is running at a high speed, it is possible to prevent dazzling of the driver of the target object B due to delay of the swivel operation of the headlights.

Second Embodiment

Figure 4:
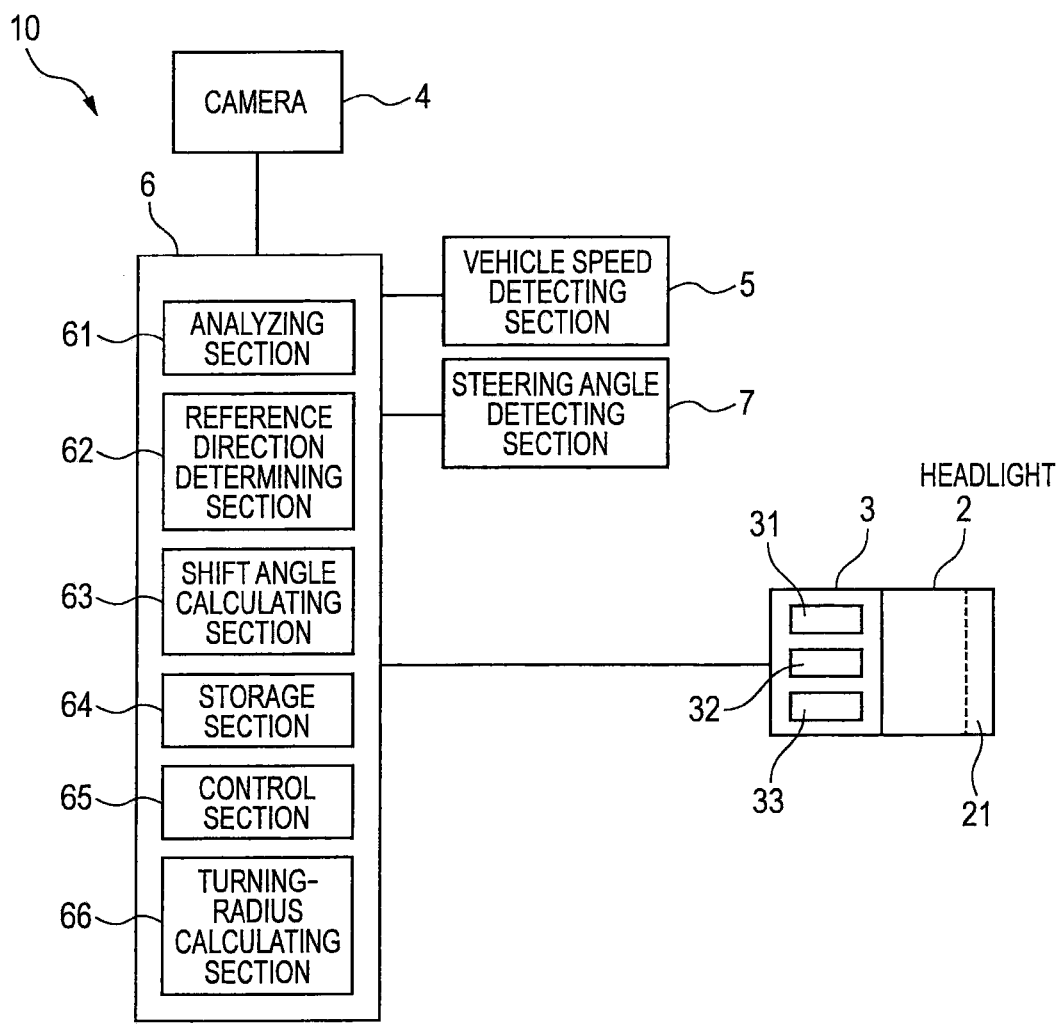
FIG. 4 is a diagram showing the structure of a vehicular headlight apparatus according to a second embodiment of the invention.

Next, a vehicular headlight apparatus 10 according to a second embodiment of the invention is described. As shown in FIG. 4, the vehicular headlight apparatus 10 includes a steering angle detecting section 7 in addition to the components included in the vehicular headlight apparatus 1 according to the first embodiment. Further, in the second embodiment, the ECU 6 includes a turning radius calculating section 66.

The steering angle detecting section 7, which is for detecting the steering angle of the vehicle, is constituted of a steering sensor. The steering angle detecting section 7 transmits data indicative of the detected steering angle to the ECU 6. The turning radius calculating section 66 calculates the turning radius of the vehicle based on detection results received from the vehicle speed detecting section 5 and the steering angle detecting section 7.

Figure 3:
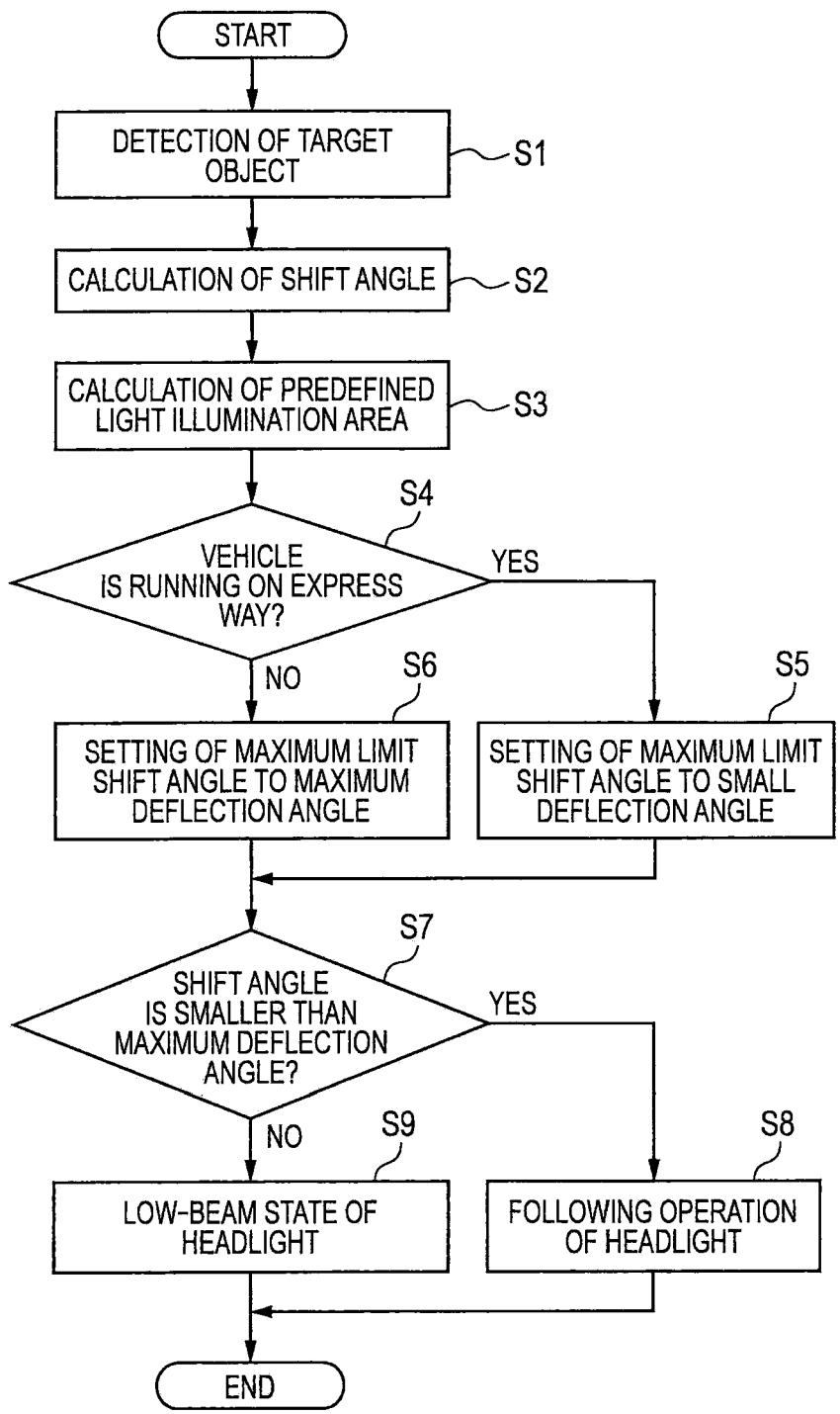
FIG. 3 is a flowchart showing an operation of the vehicular headlight apparatus according to the first embodiment.

The control section 65 includes, in addition to the operation flow shown in FIG. 3, an operation flow which is the same as the operation flow shown in FIG. 3 except that the content of step S4 is for determining whether or not the turning radius is smaller than a predetermined threshold. In the second embodiment, if the determination result in step S4 is affirmative, that is, if the turning radius is smaller than the predetermined threshold, the maximum limit shift angle is set to the small deflection angle. On the other hand, if the determination result in step S4 is negative, that is, if the turning radius is larger than or equal to the predetermined threshold, the maximum limit shift angle is set to the maximum deflection angle.

According to the second embodiment configured to decrease the maximum limit shift angle when the turning radius of the vehicle is small, it is possible to prevent dazzling of the driver of the target object B due to delay of the swivel operation of the headlights when the vehicle turns sharply, because a change to the low-beam state is made earlier.

Third Embodiment

Next, a third embodiment of the invention is described. The third embodiment differs from the first embodiment in that the maximum value of the following-operation start range is set to a value smaller than the small deflection angle. For example, in the third embodiment, the maximum deflection angle is set to 5 degrees, the small deflection angle is set to 4 degrees, and the following-operation start range is set to the range from the predetermined angle slightly smaller than 2 degrees to 2 degrees. Further, in the third embodiment, the following-operation start range is set differently between when the vehicle is running at a high speed and when the vehicle speed is running at an intermediate speed or a low speed. That is, in the third embodiment, the following-operation start range is set to a high-speed following-operation start range when the vehicle is running at a high speed, and set to an intermediate/low-speed following-operation start range when the vehicle is running at an intermediate speed or a low speed. The maximum value of the high-speed following-operation start range is set smaller than the maximum value of the intermediate/low-speed following-operation start range. For example, the maximum value of the high-speed following-operation start range is set to approximately half the small deflection angle, and the maximum value of the intermediate/low-speed following-operation start range is set to approximately half the maximum deflection angle.

Figure 5:
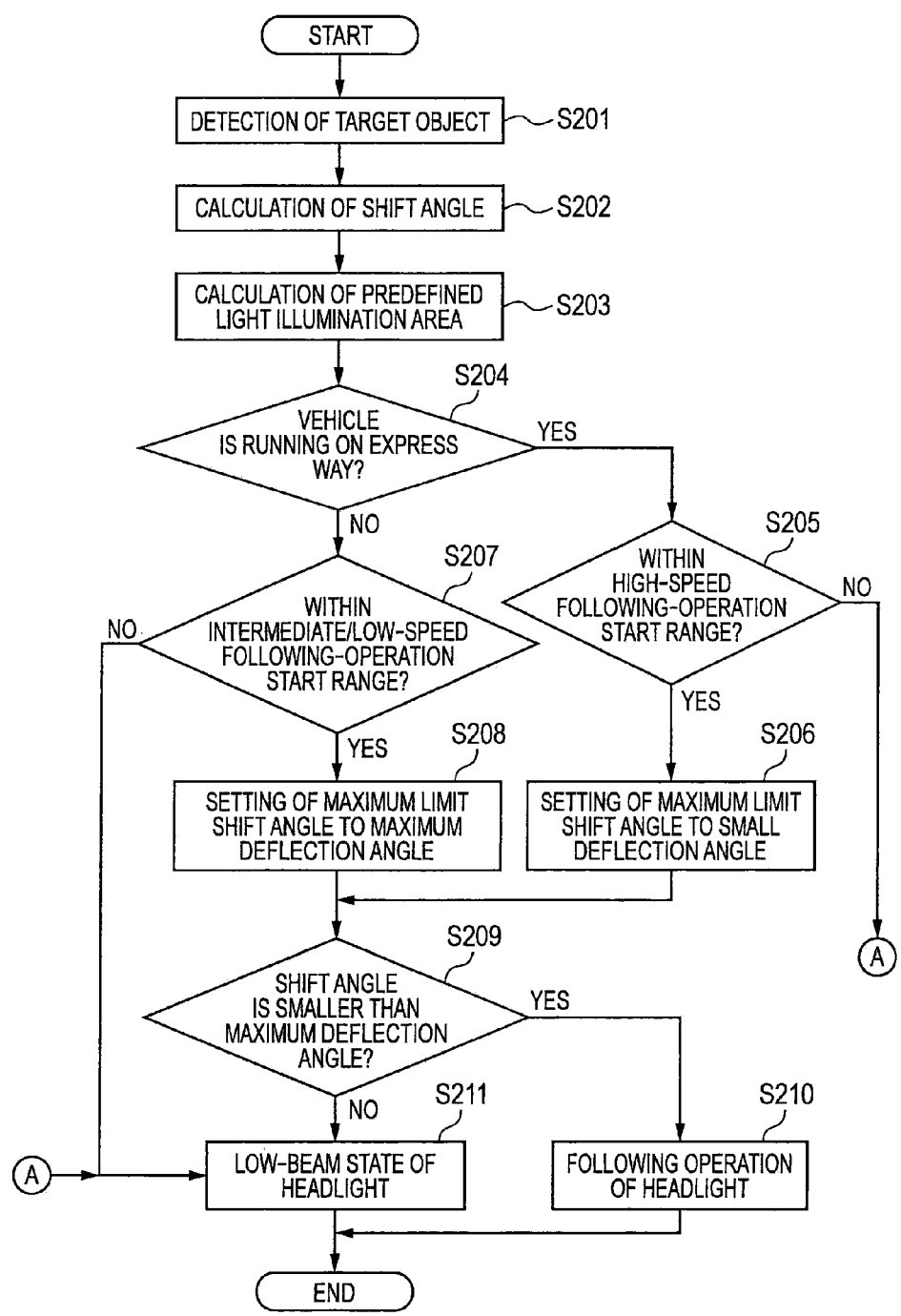
FIG. 5 is a flowchart showing an operation of a vehicular headlight apparatus according to a third embodiment of the invention.

Next, an operation of the ECU 6 in the third embodiment is explained with reference to the flowchart of FIG. 5.

Like the first embodiment, a target object B is detected in step S202, the shift angle is calculated in step S202, and the predefined light illumination area is calculated in step S203. Subsequently, it is determined whether or not the vehicle speed is larger than a predetermined value (80 km/h, for example) in step S204. If the determination result in step S204 is affirmative, it is determined whether or not the shift angle is within the high-speed following-operation start range in step S205. This is because, in the third embodiment, the maximum value of the following-operation start range is different from the maximum limit shift angle.

If the determination result in step S205 is affirmative, the maximum limit shift angle is set to the small deflection angle in step S206. If the determination result in step S205 is negative, the present light illumination area is changed to the low-beam light illumination area in step S211.

If the determination result in step S204 is negative, it is determined whether or not the shift angle is within the intermediate/low-speed following-operation start range in step S207. If the determination result in step S207 is affirmative, the maximum limit shift angle is set to the maximum deflection angle in step S208. If the determination result in step S207 is negative, the present light illumination area is changed to the low-beam light illumination area in step S211.

After completion of step S206 or S208, it is determined whether or not the shift angle is smaller than or equal to the maximum limit shift angle in step S209. If the determination result in step S209 is affirmative, the following operation is continued in step S210. If the determination result in step S209 is negative, the present light illumination area is changed to the low-beam light illumination area in step S211.

If the shift angle is within the following-operation start range when the target object B is detected, the third embodiment operates in the same way as the first embodiment. If the shift angle is outside the following-operation start range when the target object B is detected, the present light illumination area is changed to the low-beam light illumination area regardless of the value of the maximum limit shift angle.

In the case where the maximum limit shift angle and the maximum value of the following-operation start range are the same with each other, if the following operation is started while an oncoming vehicle (target object B) is approaching, this maximum limits shift angle is reached immediately thereafter, and a change to the low-beam state is made. That is, in this case, changes from the high-beam state to the intermediate-beam state, and from the intermediate-beam state to the low-beam state are made during a short time period. Such frequent changes of the beam state of the headlights in a short time period may cause the vehicle driver of the vehicle to feel worsening of visibility. When the vehicle is running at a high speed, such frequent changes are made in a further shorter time period.

In the third embodiment, when an oncoming vehicle is detected within a short distance from the vehicle (outside the following-operation start range), a change from the high-beam state to the low-beam state without passing through the intermediate-beam state is made, and when an oncoming vehicle is detected away from the vehicle (within the following-operation start range), a change from the high-beam state to the low-beam state through the intermediate-beam state is made. According to the third embodiment, it is possible to make a change from the high-beam state to the low-beam state without passing through the intermediate-beam state when the target object B is detected with the shift angle being (3 degrees, for example) between the maximum value (2-2.5 degrees, for example) of the following-operation start range and the small deflection angle (4 degrees, for example).

Hence, according to the third embodiment, it is possible to prevent that the present light illumination area is changed frequently in a short time when a target object is detected within a short distance from the vehicle, because the change is made without passing through the intermediate-beam state. In addition, the third embodiment provides, in addition to the advantages provided by the first embodiment, the advantage that the vehicle driver is provided with good visibility.

The following-operation start range may be one in number. In this case, a step for determining whether or not the shift angle is within the following-operation start range is added between step S203 and step S204, and if the determined result in this added step is affirmative, the operation proceeds to step S204, and otherwise proceeds to step S211. Accordingly, in this case, steps S205 and S207 are unnecessary. Alternatively, in this case, the operation flow may be modified such that the following operation of the headlights is started when the shift angle is detected to be within the following-operation start angle in the added step, step S205 or step S207.

The above explained preferred embodiments are exemplary of the invention of the present application which is described solely by the claims appended below. It should be understood that modifications of the preferred embodiments may be made as would occur to one of skill in the art.

What is claimed is:

1. A vehicular headlight apparatus comprising:
   a headlight for illuminating ahead of a vehicle;
   means for changing a light illumination area of the headlight;
   means for recognizing ahead of the vehicle;
   means for detecting a predetermined target object based on data outputted from the recognizing means, and calculating positions in a vertical direction and in a lateral direction of the target object;
   means for controlling the changing means;
   means for determining a reference direction with respect to a direction of light emission of the headlight when the target object is detected;
   means for calculating a shift angle of the target object with respect to the reference direction based on an installed position of the headlight;
   means for storing a maximum following angle set to a maximum limit of the shift angle to follow the target object; and
   the controlling means being configured to, when the target object is detected, change the light illumination area for purpose of following the target object based on results of the means for detecting the predetermined target until the shift angle exceeds the maximum following angle;
   wherein
   the vehicular headlight apparatus further comprises:
   means for detecting a speed of the vehicle; and
   means for storing a small following angle smaller than the maximum following angle,
   the controlling means being configured to, if a detection value of the means detecting the speed of the vehicle exceeds a predetermined threshold value, set the maximum limit of the shift angle to the small following angle, and change the light illumination area to a low-beam light illumination area if the shift angle calculated by the calculating means exceeds the small following angle.

2. The vehicular headlight apparatus according to claim 1, further comprising means for detecting a steering angle of the vehicle, and means for calculating a turning radius of the vehicle based on detection values of the means detecting the speed of the vehicle and the means detecting the steering angle of the vehicle,
   the controlling means being configured to, when the turning radius is calculated to be smaller than a predetermined threshold value, set the maximum limit shift angle to follow the target object to the small following angle, and change the light illumination area to the low-beam light illumination area if the shift angle exceeds the small following angle.

3. The vehicular headlight apparatus according to claim 2, wherein the target object is an oncoming vehicle.

4. The vehicular headlight apparatus according to claim 1, wherein the target object is an oncoming vehicle.

* * * * *